June 27, 1950 R. G. SAGEBEER 2,513,110
TIME DETERMINING DEVICE
Filed June 2, 1949 3 Sheets-Sheet 1
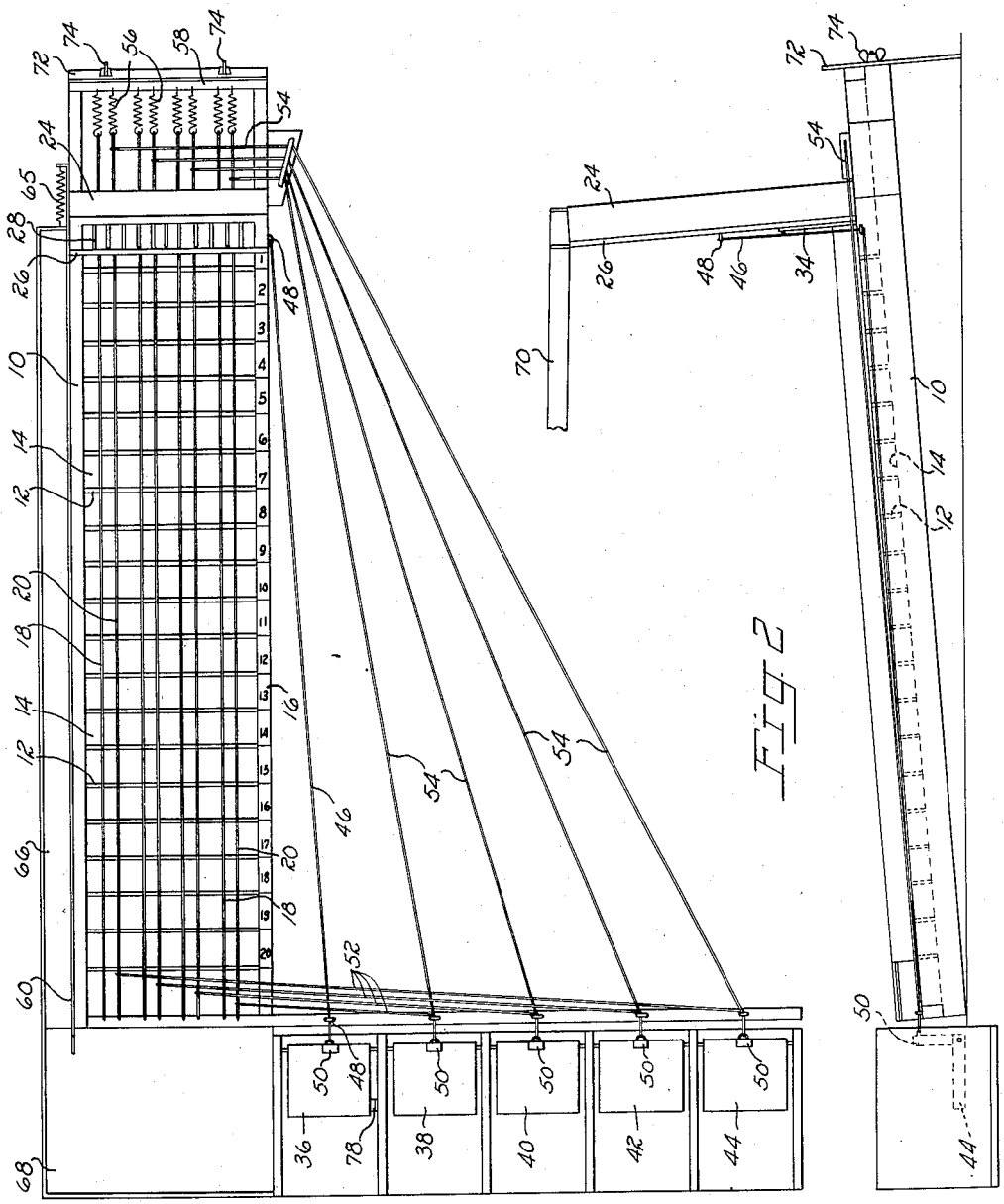
Inventor
RICHARD G. SAGEBEER
By
Lindsey, Prutzman & Just
Attorneys June 27, 1950  R. G. SAGEBEER  2,513,110
TIME DETERMINING DEVICE
Filed June 2, 1949  3 Sheets-Sheet 2
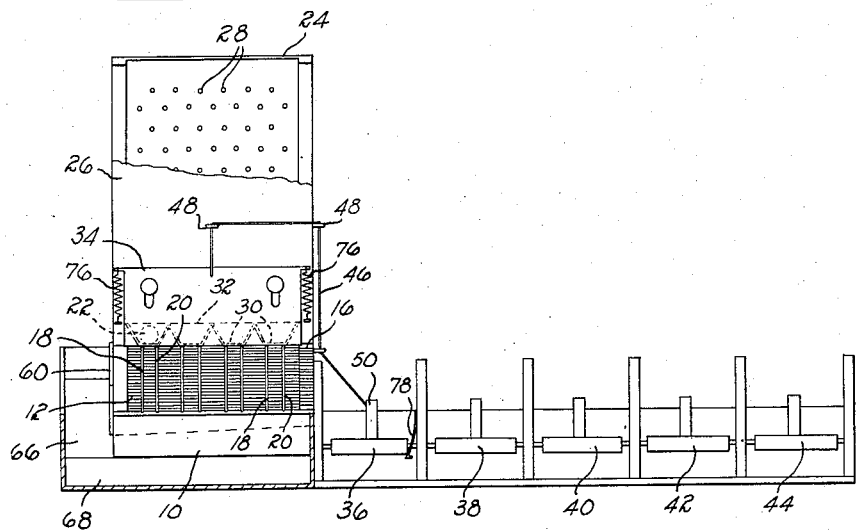
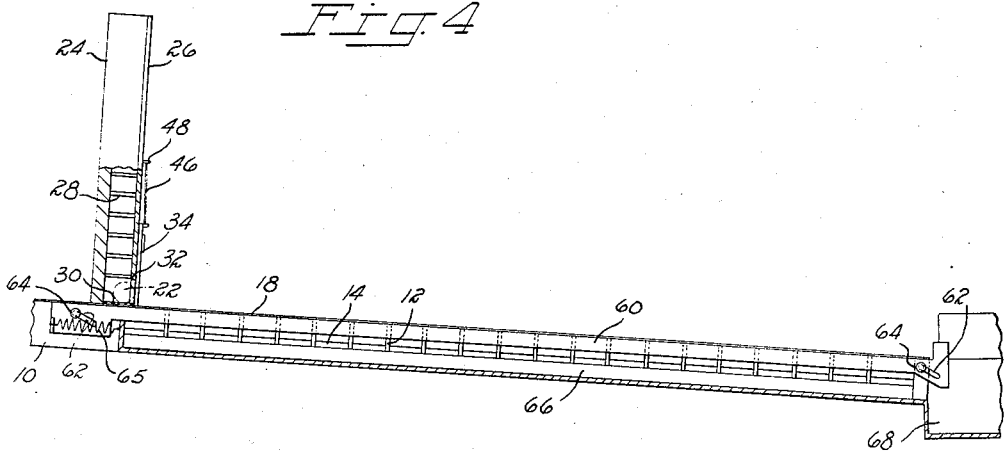
Inventor
RICHARD G. SAGEBEER
By
Lindsey, Prutzman & Just
Attorneys

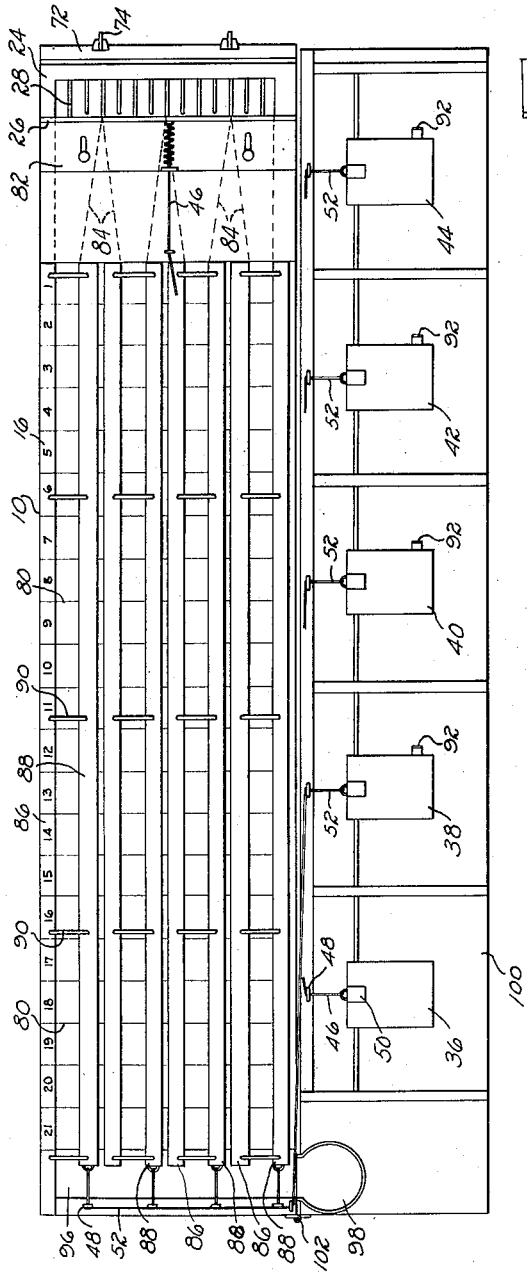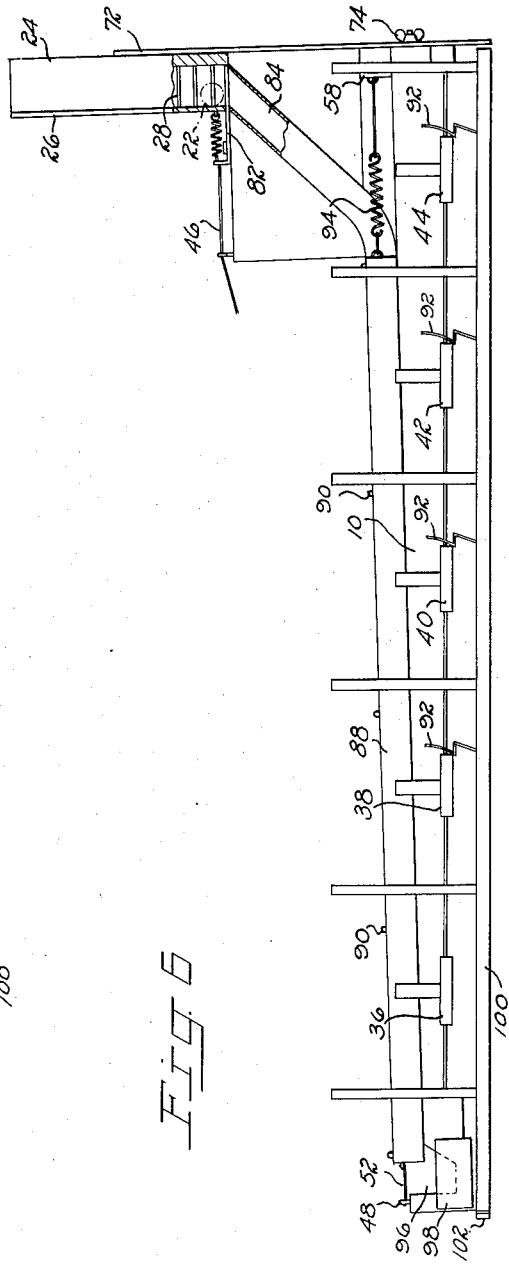

Patented June 27, 1950

2,513,110

UNITED STATES PATENT OFFICE 2,513,110

TIME DETERMINING DEVICE

Richard G. Sagebeer, West Hartford, Conn.

Application June 2, 1949, Serial No. 96,800

10 Claims. (Cl. 161—15)

This invention relates to devices for determining or measuring time and, more particularly, but without restriction thereto, to devices for determining or measuring reaction time; that is, the time elapsed between two specified physical operations and indicating such time for either comparative purposes between two or more individuals or for measuring with reasonable accuracy the time elapsed between two manual operations performed sequentially by a single individual.

One exemplary illustration comprises measuring or determining a factor used in computing the length of time elapsed between the depression or operation of two pedals or buttons, the second pedal or button being operated after the first one is operated and the second one being operated only after a mental or physical or psychophysical reaction takes place. A device of this nature is useful, for example, in measuring physiological or psychological effects in one or more individuals being studied. However, while the devices embodying the present invention are useful for scientific purposes, the same devices may also be used for recreational or amusement and game purposes.

It is an object of the present invention to provide a time measuring or determining device comprising a plurality of pathways along which a rolling object may move, providing means for unpredictably selecting one of said pathways and disposing the rolling object adjacent one end thereof, providing additional means operated by one manually movable member for instituting movement of the object along the selected pathway, providing still another manually movable member for stopping movement of the rolling object along said pathway, and also providing measuring or reference scale means for either indicating directly or by comparison the amount of time elapsed between the physical movement of the means which institutes motion to the object rolling down the pathway and subsequent actuation of means which stops the rolling object after moving along the pathway at either a predetermined fixed speed or accelerated speed.

Among other objects of the invention is the provision of several embodiments of means for starting and stopping the rolling object while moving along an unpredictably selected pathway of devices embodying the invention, and also various means for returning the rolling objects to their starting position.

Details of these objects and of the invention, as well as other objects thereof, are set forth in the following specification and illustrated in the accompanying drawings comprising part thereof.

In the drawings:

Fig. 1 is a plan view of one embodiment of a device incorporating the principles of the present invention.

Fig. 2 is a side elevation of the device shown in Fig. 1, part of the device being broken away in this figure for purposes of convenience.

Fig. 3 is a front elevation of the device shown in Fig. 1, part of the device being shown in section to better illustrate details thereof.

Fig. 4 is a fragmentary side elevation, partially in section, of the device shown in Fig. 2 but viewed from the side thereof opposite that shown in Fig. 2.

Fig. 5 is a plan view of another embodiment of device employing the basic principles of the invention.

Fig. 6 is a side elevation of the device shown in Fig. 5.

The invention consists essentially of a device embodying one or more preferably parallel tracks or pathways along which a rolling object, such as a ball or sphere, is caused to roll. Means are also provided for automatically and unpredictably selecting one of the pathways along which the rolling object moves. A manually operable means such as a pedal or button is provided for operation by the participant or subject whose reaction time is being studied for purposes of instituting rolling movement of the object along the pathway which has been unpredictably selected, and other manually movable pedals or buttons are provided for each of the pathways, said latter pedals or buttons being operable to stop the movement of the rolling object moving along the selected pathway after the operator has gone through the mental and physical processes of visibly determining the pathway along which the object is rolling and pressing the stop pedal or button corresponding thereto. Suitable reference means, such as scales and/or rows of pockets beneath the pathways, are provided for purposes of either directly measuring, or providing a factor for use in determining by calculation, the time elapsed between the depression of the button which institutes movement of the rolling object and the depression of the pedal or button which stops movement thereof. Readings afforded by such scales or pockets can also be used as a direct basis for comparing the repective times required by several individuals.

The pathways are preferably arranged on a runway which may be either horizontal or inclined. If horizontal, motion instituting means such, for example, as a releaseable spring or an incline is provided at the starting end of the rows of pathways. Rolling friction between the object and pathway will be substantially negligible and can thus either be ignored or corrected by a small increase in the inclination of the runway. Under these circumstances, evenly spaced indicia along the pathway and/or evenly spaced pockets or compartments beneath the pathway may be used for purposes of either directly measuring the elapsed time during which the rolling object has rolled or for comparing the elapsed time during which the object has rolled when started and stopped by different individuals being scientifically compared or tested or when using the devices as a game for amusement.

In the event the runway including pathways is inclined, movement of the rolling ball will be accelerated from the time its motion starts until the object is stopped. If desired to directly measure elapsed time, a scale may be provided along the runway on which the indicia are spaced apart accurately at progressively greater distances, since for accelerated motions the distances are proportional to the squares of the elapsed times. The indicia may show actual times for a standard value of gravity and a standard inclination of the runway. In case these standard values are not used, the indicia will still be exactly proportional to the elapsed times, and the actual elapsed times can easily be computed if desired with a correction factor appropriate to the deviations from the standard values for gravity and inclination. A device of this nature may thus be used as a reasonably accurate instrument for measuring intervals of time of not too long duration. Such intervals of time may be those which take place between the occurrence of any two events such as described above transpiring in sequence and it is desired to measure the time elapsing between the subsequently occurring events.

All of the above described examples are possible with the exemplary devices selected for illustration and description herein, either directly or with only minor variations, both of which embody the basic principles of the invention. The first of these is illustrated in Figs. 1 through 4 and the second in Figs. 5 and 6.

Referring to the embodiment shown in Figs. 1 through 4, a preferably flat runway 10 is shown disposed at a slight incline to the horizontal. Spaced at even distances along said runway are a plurality of transversely extending strips 12 which define therebetween a plurality of compartments 14 and extend commonly across all pathways. A reference scale 16 is provided at any suitable location as along one side of the runway and is mounted above the strips 12 and preferably parallel to the runway 10 and a plurality of preferably parallel pathways arranged side by side, each of said pathways being defined by pairs of wires 18 and 20 supported at opposite ends above the runway 10. A rolling object such as a ball or sphere 22 is arranged to roll along one of the pathways defined by the pairs of wires 18 and 20 and the diameter of said sphere 22 is greater than the distance between said pairs of wire defining each pathway.

In the embodiment shown in Figs. 1 through 4, the strips 12 have been evenly spaced apart and, thus, since the pathways and runway are inclined, the sphere 22 will accelerate while moving along the pathways. Therefore, the strips 12 are evenly spaced apart, the indicia on scale 16 may only be used for comparative purposes to measure reaction time between two or more individuals whose times of reaction are being compared or as a factor in computing the actual rolling time. If it were desired to measure reaction time directly from the scale 16 it would only be necessary to space the strips 12 in progressively greater spaced or squared relationship arranged accurately in accordance with the local value of the force of gravity and the standard inclination of the incline of the runway 10. The indicia on the scale 16 would, of course, also have to be arranged logarithmetically to correspond to the spaces of the strips 12.

Means for unpredictably selecting one of the pathways down which the sphere 22 shall roll comprise a casing 24 which has an opaque front wall 26 in order that the individual operating the device may not see into the interior of the casing 24. Extending between the front and rear walls of the casing 24 are a plurality of pins 28, the distances between adjacent pins being greater than the diameter of the sphere 22. The top of the casing 24 is open so that a sphere 22 may be introduced anywhere along the top of the casing. Gravity will cause the sphere to move downward through the maze of pins 28 along an unpredictable path or course and be disposed in one of the short channels 30 formed in the bottom of the casing 24, there being one channel for each pathway defined by the pairs of wires 18 and 20. The lower edge 32 of the front wall 26 of the casing 24 terminates above the wires 18 and 20 a sufficient distance to permit the sphere 22 to roll under the lower edge 32.

The opening between the edge 32 and the wires is closed by a vertically slidable gate or shutter 34 which is also opaque whereby, after the sphere 22 has been deposited in one of the short channels 30 which has been unpredictably selected, as a result of the sphere passing through the maze of pins 28, there is then no way of determining which channel 30 contains the sphere without raising the shutter 34.

Arranged preferably along the forward or front portion of the runway 10, and extending to one side thereof in the exemplary embodiment shown in Figs. 1 through 4, is a plurality of pedals or buttons 36, 38, 40, 42, and 44 which are pivotally supported at one end. The pedal 36 is connected by a flexible wire or cord 46 to the shutter 34, said wire or cord passing through suitable guide means such as eyelets 48. One end of the wire or cord 46 is attached to the upper edge of the shutter 34 and the other end thereof is secured to the upper end of an upstanding projection 50 on the rear end of pedal 36, there also being one of said projections on each of the other pedals or buttons.

The other pedals 38, 40, 42 and 44 are respectively connected to one wire of each pair of wires respectively defining the side by side pathways on the runway 10. The connection between the pedals and said one wire of each pair comprises two flexible wires or cords 52 and 54 which are, respectively, connected at one of their ends to the projection 50 on the pedal and at their other ends to said one wire of each pair adjacent the opposite ends thereof. Thus, when one of the pedals 38, 40, 42, and 44, which respectively correspond to the four pathways illustrated on the runway, is depressed, the wire 20 of that runway is moved away from the fixed wire 18 thereof due to the wire 20 being pulled laterally away from the wire 18 by the wires or cords 52 and 54 connected to the pedal corresponding to the runway. Such movement of the wire 20 is possible due to all of the wires and especially the wires 20 of each pair being supported at one end by resilient means such as a coil spring 56 which connects the rearward end of the wires to a fixed part 58 of the runway.

The operation of the device is as follows:

The individual operating the device either as a participant in a game, or as a subject being scientifically studied, for example for psychophysical reaction time, depresses the pedal 36 after the sphere 22 has been introduced to the maze of pins 28 and, as a result, has descended unpredictably to one of the channels 30. Depression of the pedal 36 raises the gate or shutter 34 and permits the sphere 22 to roll onto and down the pathway directly in front of the channel 30 into which the sphere 22 has descended. The individual operating the device must then visually determine which of the four other pedals should be depressed in order to cause the sphere to drop into one of the numbered compartments beneath that pathway. The more rapid his reaction, the smaller will be the number of compartments passed over by the sphere while rolling along the wires 18 and 20 of the pathway until the pedal corresponding to the pathway is depressed to cause the wires of that pathway to be spread apart sufficiently to permit the sphere to drop therebetween into the compartment directly below it at the time the pedal is depressed. The actual time of his reaction can be approximated with reasonable accuracy from the product of the square root of the compartment integer or indicia multiplied by a quantity which depends only upon the grade of the incline and the force of gravity which will cause the sphere to accelerate as it travels down the incline of the pathway. As stated above, it is assumed that friction can be neglected.

The runway 10 is preferably inclined downward from the end adjacent the maze to the front end of the device. Also, the runway 10 slopes slightly downward from the right edge to the left, as shown in Fig. 3. Thus, when the sphere 22 has been deposited in one of the compartments 14 between the transverse strips 12, the integer or indicia on the scale 16 can be read quickly. The sphere then automatically will roll to the lefthand side of the compartment 14 relative to Fig. 3, into which it has been deposited and be held there by a movable gate 60 which extends longitudinally along the lefthand side of the runway 10 for the entire length thereof. The gate is preferably provided with a plurality of diagonally extending slots 62 which have supporting bolts or pins 64 extending therethrough to support and guide the gate 60. When the front end of the gate 60 is engaged and pressed by the operator to move it longitudinally toward the rear of the device, the diagonal slots 62 will cause the gate 60 to be elevated and permit the sphere 22 to roll outward into a return channel 66, the latter being inclined preferably in the same direction as the runway 10 so that the sphere will roll forwardly into a collecting compartment 68.

The invention also contemplates the provision of a return channel 70 which is disposed considerably above the runway 10 and extends downward from the front to the rear of the device. The gate 60 is normally maintained closed by the spring 65 which biases the gate forwardly. Thus, the sphere may be picked from the compartment 68 by the operator, placed in the forward end of the return channel 70, and be permitted to run along the channel 70 and be automatically introduced into the open upper end of the casing 24 which encloses the maze of pins 28.

The inclination of the runway 10, and correspondingly the pathways thereon, is determined by one or more supporting legs 72 which is preferably adjustably connected to the rear end of the runway 10. The legs 72 are preferably longitudinally slotted and are connected to said rear end of the runway by bolts and wing nuts 74 so that the inclination may be varied if desired. The legs 72 may even be removed to permit the runway 10 and the pathways thereon to be disposed horizontally. Under these circumstances some means will be required to initiate movement of the sphere from the receiving or starting channels 30 and along the pathways of the runways. This can be done, for example, by inclining the bottom wall of the channels 30 or even providing an inclined covered guideway of greater length than will be afforded by merely inclining the bottom walls of the short channels 30. That is, when the shutter 34 is raised by the depression of the pedal 36, some means is necessary to cause the sphere 22 to roll along the guideway which has been unpredictably selected by the maze of pins 28 and any means of the nature just described would be suitable.

The shutter 34 is normally retained in its lower position by springs 76 and the shutter is guided by suitable slots and head pins, clearly shown in Fig. 3. After the pedal 36 has been depressed, it may be retained in depressed position if desired by a resilient leaf spring stop 78 shown in Figs. 1 and 3.

The embodiment of the invention illustrated in Figs. 1 through 4 contemplates the use of pathways defined by pairs of spaced wires, one of said wires being movable away from the other to permit a sphere rolling therealong to drop into one of the compartments below the pathway. The embodiment shown in Figs. 5 and 6 involves the use of the same basic principles as that shown in Figs. 1 through 4 for measuring or determining time elapsing between two physical actions on the part of an operator using the device. However, the embodiment shown in Figs. 5 and 6 utilizes somewhat different but equally useful means for defining the pathways, for initiating movement of the sphere for causing an object to roll along or down one of the pathways which has been unpredictably selected, and a different operation of the pathway defining means to cause the sphere to be stopped in its movement as a result of subsequent action on the part of the operator.

Referring to the embodiment in Figs. 5 and 6, the runway 10 is provided with a plurality of transversely extending reference lines 80 disposed upon the upper face of the runway. The reference scale 16 is similar to that shown in Fig. 1. The foregoing statements made relative to the embodiment shown in Figs. 1 through 4 in regard to the runway 10 being inclined or horizontal apply equally to the embodiment shown in Figs. 5 and 6 and hence a repetition of that description will be omitted here relative to Figs. 5 and 6.

This latter embodiment also utilizes a casing 24 enclosing a maze of pins 28 but the lower end of the casing is preferably disposed higher above the runway 10 than in the embodiment of Figs. 1 through 4, as will be clearly seen in Fig. 6. The lower end of the casing 24 is preferably closed by a horizontally slidable gate 82 which is disposed above the upper ends of a plurality of guide chutes 84, there being one guide chute for each pathway. In this embodiment, the pathways are respectively defined by pairs of preferably rigid strips 86 and 88 which extend longitudinally along the upper surface of the runway 10, strip 88 being movable longitudinally relative to the strip 86 of each pair and the latter being fixed relative to the runway 10.

As in the first embodiment of the invention, this embodiment is also provided with a plurality of pedals or buttons 36, 38, 40, 42 and 44 which are pivotally mounted at one end and a projection 50 extends upwards from the inner end of each pedal. The movable strip 88 of each pair is connected to the fixed strip 86 of said pair by means which will normally hold the strips separated a distance slightly greater than the diameter of the sphere 22 so that the sphere normally may roll between said strips. The connecting means in the exemplary illustration shown in Fig. 5 comprises a plurality of spaced bail means 90 which are, for example, U-shaped and the ends of the bails extend into parallel apertures in the strips. Said ends pivotally move relative to the strips. Thus, when the strip 88 is moved longitudinally relative to strip 86 in any selected pathway, the strip 88 will be moved toward strip 86 and such movement will cause the sphere to be wedged between the strips so as to stop movement of the sphere down the pathway. Movement of the strip 88 is accomplished by connecting the front or lefthand ends of strips 88 as viewed in Fig. 5, respectively to the pedals 38, 40, 42 and 44 by flexible cords or wires 52. The latter are guided by suitable eyelets 48. Since a sphere is stopped in this embodiment of the invention by moving the strips 86 and 88 closer together as a result of depressing one of the pedals, the pedals 38, 40, 42, and 44 are provided with flexible spring latches 92 to releasably hold the pedals depressed until a reading of the scale 16 is obtained.

The operation of the embodiment shown in Figs. 5 and 6 is, briefly, as follows:

The operator using the device either as a game or as a reaction testing means first depresses the pedal 36 to retract the gate 82 from beneath the lower end of the maze in casing 24 to permit the sphere 22 to roll down the unpredictably selected guideway 84 and be introduced into one of the pathways defined by a pair of strips 86 and 88. The guide chutes 84 are preferably opaque so that the operator will not see the sphere until it emerges from the lower end of the guide chute down which it is traveling. He then visually determines which one of the four other pedals should be depressed in order to stop the sphere. As in the other embodiment, the more rapid his reaction the smaller will be the number of spaces along the runway 10 within which the sphere will be stopped. As above described, the sphere is stopped in this embodiment of the invention by the depression of one of the pedals moving the strip 88 of the selected guideway toward the fixed strip 86 thereof to wedge the sphere therebetween and the pedal is held depressed by the latch 92 thereof.

The spheres are recovered by releasing the latch 92 to cause the pedal engaged thereby to rise and permit the spring 94, attached to the righthand end of each of the movable strips 88 as shown in Fig. 6, to restore the strip 88 to the position thereof shown in Fig. 5. This will cause the strips to disengage the sphere 22 and permit it to roll into a collecting compartment 96 at the forward or lefthand end of the device as shown in Figs. 5 and 6. The bottom wall of the compartment 96 is inclined so that the spheres will roll into a collecting cup 98. If desired, a return chute or channel similar to channel 70 in Fig. 2 may be provided to permit a return of the sphere to the upper end of the maze casing 24.

It is also contemplated that, in the embodiment shown in Figs. 5 and 6, the member 100 which supports the pedals may be pivotally connected to the runway 10 by hinge means 102 so that the pedals and member 100 may be disposed adjacent at one side of the runway as shown in Figs. 5 and 6. However, the arrangement of the wires or cords 52 and their guide means is such that the pedals and supporting member 100 may, if desired, be moved so that the longitudinal axis of the member 100 may be disposed at right angles to the longitudinal axis of the runway 10 or at another angular position relative thereto which may be permitted by the hinge means 102.

It will thus be seen that the two exemplary embodiments of the device utilizing the principles of the present invention offer versatile and flexible means for measuring short intervals of time either on the basis of direct readings or to obtain results which may be used as for comparison with results of other individuals using the same device and under the same circumstances. Also, as stated above, the device may be used either for scientific or amusement and recreational purposes in which timing is considered basically necessary.

While the invention has been illustrated in its several preferred embodiments and has included certain details, it should be understood that the invention is not to be limited to the precise details herein illustrated and described since the same may be carried out in other ways, falling within the scope of the invention as claimed.

I claim as my invention:

1. A device for determining elapsed intervals of time between the occurrence of two events comprising, in combination, a plurality of pathways arranged side by side, reference means extending along said pathways, an object constructed and arranged to roll along one of said pathways, means operable to place said object adjacent the end of one of said pathways unpredictably selected by said means, means to initiate movement of said object along said selected pathway, and stopping means individually associated with each pathway and operable to stop movement of the object in the pathway along which it is traveling.

2. A device for determining elapsed intervals of time between the occurrence of two events comprising, in combination, a plurality of pathways arranged side by side and inclined from one end to the other, reference means extending along said pathways, an object constructed and arranged to roll along one of said pathways, means operable to place said object adjacent the end of one of said pathways unpredictably selected by said means, means to initiate movement of said object along said selected inclined pathway, and stopping means individually associated with each pathway and operable to stop movement of the object in the pathway along which it is traveling.

3. A device for determining elapsed intervals of time between the occurrence of two events comprising, in combination, a plurality of pathways arranged side by side, reference means extending along said pathways, an object constructed and arranged to roll along one of said pathways, a maze operable to receive and cause said object to be placed adjacent the end of one of said pathways unpredictably selected by said maze, a gate positioned to retain said object in starting position and movable away from said object to permit movement of said object along said selected pathway, and stopping means individually associated with each pathway and operable to stop movement of the object in the pathway along which it is traveling.

4. A device for determining elapsed periods of time between two events comprising, in combination, a plurality of pathways arranged side by side and each comprising a pair of spaced parallel flexible means, a sphere of greater diameter than the distance between the flexible means of each pathway, means operable to place said sphere adjacent one end of one of said pathways unpredictably selected by said means, a gate movably mounted adjacent said one end of said pathways and movable therefrom to initiate movement of said sphere along the selected pathway, means individually connected to one of said flexible means of each pathway and operable to separate the flexible means of a selected pathway sufficiently to cause said sphere to drop therebetween at the instant of such separation, and reference means associated with said guideways to indicate the extent of travel of the sphere at the time it drops between the flexible means.

5. A device for determining elapsed periods of time between two events comprising, in combination, a plurality of pathways arranged side by side and each comprising a pair of spaced parallel wires, a sphere of greater diameter than the distance between the wires of each pathway, means operable to place said sphere adjacent the end of one of said pathways unpredictably selected by said means, a gate movably mounted adjacent one end of said pathways, reference means comprising similar rows of compartments extending below each pathway, and a series of movable members, one of said movable members being connected to said gate and operable to move it from said pathways to initiate movement of said sphere down said selected pathway, and the other movable members being respectively connected to one wire of each of said pathways and operable when a selected member is actuated to move the wire connected thereto away from the other wire of that pair to cause said sphere to drop into the compartment below it at the instant the wires are separated and thus indicate the extent of travel of the sphere at the time it drops between the wires.

6. A device for determining elapsed periods of time between two events comprising, in combination, a plurality of pathways arranged side by side and each comprising a pair of spaced parallel wires, a sphere of greater diameter than the distance between the wires of each pathway, means operable to place said sphere adjacent the end of one of said pathways unpredictably selected by said means, a gate movably mounted adjacent one end of said pathways, reference means comprising similar rows of compartments defined by spaced strips extending transversely to and below said pathways, and a series of movable members, one of said movable members being connected to said gate and operable to move it from said pathways to initiate movement of said sphere down said selected pathway, and the other movable members being respectively connected to the opposite ends of one wire of each pair defining said pathways and operable when a selected member is actuated to move the wire connected thereto away from and parallel to the other wire of that pair to cause said sphere to drop into the compartment below it at the instant the wires are separated.

7. A device for determining elapsed periods of time between two events comprising, in combination, a plurality of pathways arranged side by side and each comprising a pair of spaced parallel wires, a sphere of greater diameter than the distance between the wires of each pathway, means operable to place said sphere adjacent the end of one of said pathways unpredictably selected by said means, a gate movably mounted adjacent one end of said pathways, reference means comprising similar rows of compartments defined by spaced strips extending transversely to and below said pathways, the bottoms of said compartments sloping from one end to the other, a series of movable members, one of said movable members being connected to said gate and operable to move it from said pathways to initiate movement of said sphere down said selected pathway, and the other movable members being respectively connected to one wire of each of said pathways and operable when a selected member is actuated to move the wire connected thereto away from the other wire of that pair to cause said sphere to drop into the compartment below it at the instant the wires are separated, and a sloping return chute having sphere collecting means at one end and extending along the lower ends of said rows of compartments arranged to receive the sphere as it rolls from the end of one of said rows and cause it to roll to said receiving means.

8. A device for determining elapsed intervals of time between the occurrence of two events comprising, in combination, a plurality of pathways arranged side by side, each pathway being defined by a pair of substantially parallel longitudinally extending strips spaced from each other to form the sides of the pathway and one of said strips being mounted for movement toward and from the other strip, reference means extending along said pathways, an object constructed and arranged to roll along one of said pathways between the strips thereof, means operable to place said object adjacent the end of one of said pathways unpredictably selected by said means, means to initiate movement of said object along said selected pathway, and means individually associated with the movable strip of each pathway and operable to move said strip toward the other strip of said pathway to engage the object therebetween and stop movement of the object in the pathway along which it is traveling.

9. A device for determining elapsed intervals of time between the occurrence of two events comprising, in combination, a plurality of pathways arranged side by side, each pathway being defined by a pair of substantially parallel longitudinally extending strips spaced from each other to form the sides of the pathway and one of said strips being mounted for movement toward and from the other strip, reference means extending along said pathways, an object constructed and arranged to roll along one of said pathways between the strips thereof, means operable to place said object adjacent the end of one of said pathways unpredictably selected by said means, means to initiate movement of said object along said selected pathway, a plurality of means respectively associated with the movable strip of each pathway, each means being independently depressible to move the strip associated therewith toward the other strip of said pathway defined thereby to engage the object therebetween and stop movement of the object in the pathway along which it is traveling, and a latch associated with each depressible means and operable to releasably hold each means in depressed position.

10. A device for determining elapsed intervals of time between the occurrence of two events comprising, in combination, a plurality of pathways arranged side by side and inclined from one end of the other, each pathway being defined by a pair of substantially parallel longitudinally extending strips spaced from each other to form the sides of the pathway and one of said strips being mounted for movement toward and from the other strip, reference means extending along said pathways, an object constructed and arranged to roll along one of said pathways between the strips thereof, means operable to place said object adjacent the end of one of said pathways unpredictably selected by said means, means to initiate movement of said object along said selected pathway, means individually associated with the movable strip of each pathway and operable to move said strip toward the other strip of said pathway to engage the object therebetween and stop movement of the object in the pathway along which it is rolling, said object when released being free to roll to the lower end of the guideway, and a compartment arranged at the lower ends of said guideways to receive objects after rolling down said guideways.

RICHARD G. SAGEBEER.

REFERENCES CITED

The following references are of record in the file of this patent:

UNITED STATES PATENTS

| Number | Name | Date |
|---|---|---|
| 1,662,162 | Nestor | Mar. 13, 1928 |
| 1,918,398 | Johnson | July 18, 1933 |
| 1,993,669 | Ihde | Mar. 5, 1935 |
| 2,236,536 | Hilton | Apr. 1, 1941 |
| 2,426,915 | Bains | Sept. 2, 1947 |
| 2,456,725 | Netherton | Dec. 21, 1948 |